H. G. MAULE.
VALVE.
APPLICATION FILED JULY 8, 1920.

1,385,183.

Patented July 19, 1921.

Inventor
H. G. Maule.
By Fred P. Gorin
Attorney

UNITED STATES PATENT OFFICE.

HARVEY G. MAULE, OF SEATTLE, WASHINGTON, ASSIGNOR OF ONE-HALF TO REGINALD A. PEARCE, OF KING COUNTY, WASHINGTON.

VALVE.

1,385,183. Specification of Letters Patent. Patented July 19, 1921.

Application filed July 8, 1920. Serial No. 394,655.

*To all whom it may concern:*

Be it known that I, HARVEY GRANGER MAULE, a citizen of the United States, and residing at Seattle, in the county of King and State of Washington, have invented certain new and useful Improvements in Valves, of which the following is a specification.

This invention relates to improvements in valves.

An object of the invention is to provide a simple construction in which the parts are readily accessible and which may be ground to fit.

Another object of the invention is to provide a valve which is self-cleaning so that in the operation of the valve all foreign matter is kept clear of the valve seat.

The invention also comprehends improvements in the details of construction and operation which are particularly pointed out in the following description and claim.

In the drawings:—

Figure 1:
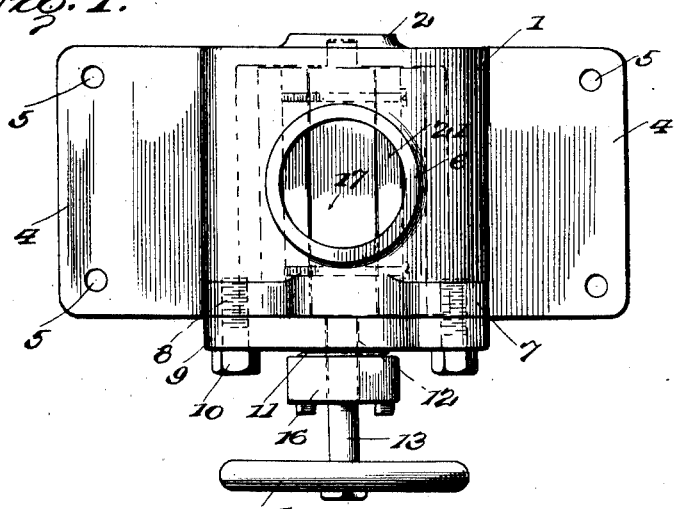
Figure 1 is a plan view of the invention.
Figure 2:
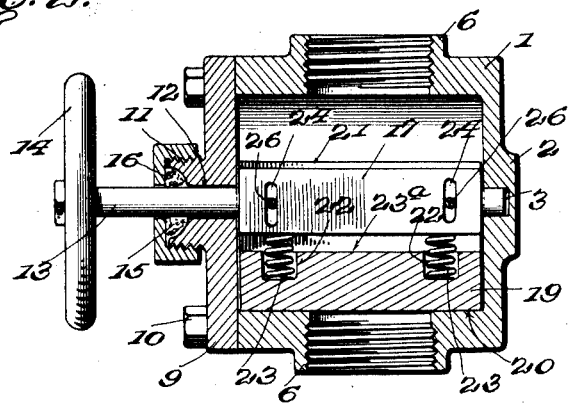
Fig. 2 is a section on line 2—2 of Fig. 1.
Figure 3:
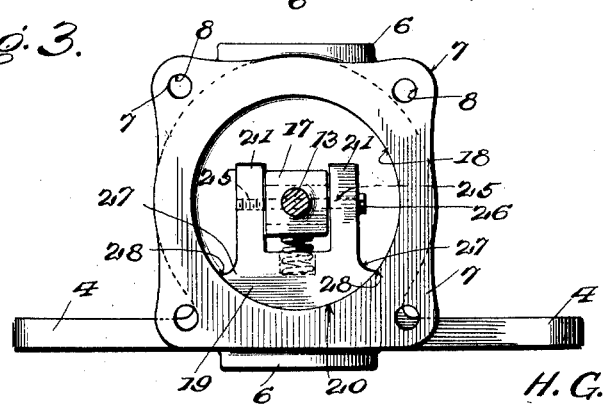
Fig. 3 is a section on line 3—3 of Fig. 1.

The valve body is formed with a hollow cylindrical member 1 closed at one end, said end being provided with a boss 2 and formed with an opening 3 adapted to form a bearing. The valve body member 1 has flanges 4 from one side thereof provided with holes 5, said flanges being adapted to be secured to suitable means for supporting the valve. The valve body is formed with hollow threaded projections 6 at diametrically opposite points between the ends of the body, and located in a plane at right angles to the flanges 4. These extensions form inlet and outlet passages to the valve body.

The open end of the valve body 1 is formed with outwardly projecting ears 7 having threaded openings 8. A plate 9 is bolted to the valve body by bolts 10 engaging in the openings 8, and forms a closure for the open end of the body. The plate is formed with a threaded projection 11, and an opening 12, adapted to form a bearing for a valve stem 13.

The valve stem 13 is rotatably mounted in the valve body in the bearing 3 and the plate 9, extending through and beyond the plate, and having an operating handle 14 secured thereto. The end of projection 11 is formed to receive packing 15 which is held in place by a packing nut 16 threaded thereon. The valve stem is formed with an enlarged squared portion 17, within the valve body and extending longitudinally of the stem between the ends of the body.

The valve chamber or hollow portion of the valve body is formed cylindrical, as indicated at 18 to form a valve seat, and a valve member 19 is formed with a similar arcuate surface 20 adapted to engage the seat 18. The valve member 19 is formed with a pair of parallel spaced flanges 21 between which the squared portion 17 of the valve stem engages for turning the valve in the chamber. The valve is formed with recesses 22 in which are mounted springs 23 for engaging the valve stem and forcing the valve into firm engagement with the seat. It is to be noted that the springs 23 are unhoused between the surface 23ª and the lowermost surface of the enlarged squared portion 17 so that any corrosion which may occur within the recesses 22 will not affect or freeze the resiliency of the springs 23. This is a very important and desirable feature.

The squared portion of the valve stem is formed with elongated transverse slots 24 and the flanges 21 are formed with openings 25 registering with a portion of the slots and adapted to receive bolts 26 passed through the slots for limiting the movement of the valve member.

In closed position the valve always closes the outlet opening, the pressure of the elements being governed serving to add additional force to hold the valve closed.

The longitudinal edges of the valve are formed with outwardly curved portions 27 terminating in edges 28 on either side which will engage any matter sticking to the valve seat and clear it away so the valve will always be in close engagement with its seat. By constructing the valve in the above manner to clean its seat, in the movement thereof, the necessity for regrinding or refitting is reduced and the valve will operate a considerable time without being repaired.

Whenever the valve or its seat becomes pitted and rough, both may be ground smooth again, the springs taking up for the part ground away and the valve will operate as effectually as it did originally.

What I claim is:—

A valve comprising a body member formed with an inlet and an outlet and open at one side, a plate closing said open side and removably secured to the valve body member, a valve mounted for rotation within the body and coöperating with the inlet and outlet for valve functions, said valve having spaced parallel wings extending therefrom, and a valve operating member supported in said plate and removably supported in the opposite end of the valve body, said valve operating member having a rectangular portion to fit between the spaced parallel wings of the valve, means connecting said rectangular portion and said wings to permit limited independent movement of said rectangular portion and valve, and springs interposed between said rectangular portion and valve and seated in recesses in the latter to normally maintain the valve in valve operating position, the mounting of the valve operating member in the removable plate for the valve body and the support of the valve from said operating member, permitting the removal of the valve and operating member with the plate closing the open end of the valve body.

In testimony whereof I affix my signature.

HARVEY G. MAULE.